United States Patent
Lutz et al.

(10) Patent No.: US 9,765,812 B2
(45) Date of Patent: Sep. 19, 2017

(54) STEERING BEARING FOR SUPPORTING A STEERING COLUMN OF A MOTOR VEHICLE

(71) Applicant: Schaeffler Technologies AG & Co. KG, Herzogenaurach (DE)

(72) Inventors: Rainer Lutz, Markt Erlbach (DE); Andreas Wollner, Nuremberg (DE); Herbert Erhardt, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/101,673

(22) PCT Filed: Oct. 15, 2014

(86) PCT No.: PCT/DE2014/200556
§ 371 (c)(1),
(2) Date: Jun. 3, 2016

(87) PCT Pub. No.: WO2015/081939
PCT Pub. Date: Jun. 11, 2015

(65) Prior Publication Data
US 2016/0305474 A1    Oct. 20, 2016

(30) Foreign Application Priority Data
Dec. 6, 2013 (DE) .......... 10 2013 225 068

(51) Int. Cl.
*F16C 25/08*    (2006.01)
*B62D 1/16*    (2006.01)
*F16C 33/58*    (2006.01)

(52) U.S. Cl.
CPC .............. *F16C 25/083* (2013.01); *B62D 1/16* (2013.01); *F16C 33/588* (2013.01); *F16C 2326/24* (2013.01)

(58) Field of Classification Search
CPC ......... F16C 25/083; F16C 33/588; B62D 1/16
See application file for complete search history.

(56) References Cited

U.S. PATENT DOCUMENTS

| | | | | |
|---|---|---|---|---|
| 2,302,742 A | * | 11/1942 | Crise ..................... | F16C 25/083 384/517 |
| 3,351,398 A | * | 11/1967 | Park ....................... | F16C 19/26 384/456 |
| 3,801,171 A | * | 4/1974 | Rozentals ............. | F16C 19/163 384/492 |
| 3,876,266 A | * | 4/1975 | Rozentals ............... | F16C 33/60 384/536 |

(Continued)

FOREIGN PATENT DOCUMENTS

| DE | 19920629 | 11/2000 |
|---|---|---|
| EP | 1273812 | 1/2003 |

(Continued)

*Primary Examiner* — Thomas R. Hannon
(74) *Attorney, Agent, or Firm* — Volpe and Koenig, P.C.

(57) ABSTRACT

A steering bearing for bearing a steering column of a motor vehicle, including an inner ring and an outer ring having respective raceways on which balls roll, the outer ring being enclosed by a sleeve in which a spring ring is arranged. The spring ring tensions the balls against the respective raceways and the balls roll on said spring ring.

6 Claims, 1 Drawing Sheet

(56) References Cited

U.S. PATENT DOCUMENTS

| | | | | |
|---|---|---|---|---|
| 4,718,781 | A * | 1/1988 | Gerard | F16C 19/166 |
| | | | | 384/495 |
| 4,913,564 | A * | 4/1990 | Stephan | F16C 19/16 |
| | | | | 384/511 |
| 5,193,917 | A * | 3/1993 | Adler | F16C 25/083 |
| | | | | 384/517 |
| 5,458,422 | A * | 10/1995 | Zernickel | F16C 19/166 |
| | | | | 384/505 |
| 6,158,896 | A * | 12/2000 | Zernickel | F16C 33/60 |
| | | | | 384/506 |
| 6,367,979 | B1 | 4/2002 | Ruoff et al. | |
| 6,668,533 | B2 * | 12/2003 | Beckman | F16C 33/425 |
| | | | | 384/458 |
| 8,997,601 | B2 * | 4/2015 | Erhardt | B62D 1/16 |
| | | | | 384/513 |
| 2003/0012473 | A1 | 1/2003 | Lutz et al. | |
| 2005/0002593 | A1 | 1/2005 | Weisskopf et al. | |
| 2016/0123385 | A1 * | 5/2016 | Bussit | F16C 19/166 |
| | | | | 384/492 |

FOREIGN PATENT DOCUMENTS

| | | | | |
|---|---|---|---|---|
| EP | -2562435 A1 * | 2/2013 | | F16C 25/083 |
| WO | 0242655 | 5/2002 | | |

* cited by examiner

STEERING BEARING FOR SUPPORTING A STEERING COLUMN OF A MOTOR VEHICLE

BACKGROUND

The invention relates to a steering bearing for supporting a steering column of a motor vehicle, with an inner ring and an outer ring each having raceways on which balls roll.

Steering bearings are used, as is known, for supporting the steering column of a steering system of a motor vehicle. They are used to support the steering spindle that connects the steering wheel to the steering gear without play. Here, the steering bearing should have, on one hand, a high stiffness, but on the other hand should also have the lowest friction design as possible, in order to enable smooth operation of the steering system. They must also be able to effectively damp noises and vibrations and should also be largely insensitive to typical shaft and housing tolerances and should guarantee a high contact pressing force with respect to the holding force on the shaft.

Previously, standard ball bearings were installed as steering bearings, but these are subject to play. For this reason, the shaft or the housing are to be produced very precisely; the permissible tolerance range is low. The matching for achieving low play with simultaneously low friction moment is complicated and difficult.

As an alternative to the use of standard ball bearings, the installation of four-point bearings produced in non-cutting processes is also known. These are relatively expensive, because they involve complicated production processes. The matching between high stiffness and low friction moment is also complicated and difficult.

SUMMARY

The invention is therefore based on the object of providing a steering bearing that offers a high degree of stiffness and simultaneously a low friction moment for more cost-effective producability.

To achieve this objective, in a steering bearing of the type named above, it is provided according to the invention that the outer ring is surrounded by a sleeve in which a spring ring is arranged that tensions the balls against the corresponding raceways and on which the balls roll.

According to the invention, the steering bearing has a spring ring that is allocated to the outer ring and is held together with the outer ring in a sleeve that surrounds both of these rings. This spring ring, which has a quasi-leaf-spring-shaped design, is a steel spring that is used as a tolerance compensation element and thus for the prestressing of the bearing. In the scope of assembly, the sleeve is flanged accordingly in a flanging process after insertion of the outer ring and the spring ring, wherein this process produces the prestressing such that the bearing has no play and the lowest possible friction moment is given. After flanging the sleeve, the spring ring tensions the balls both against the raceway of the outer ring and also against that of the inner ring, wherein the spring ring simultaneously also forms a ball raceway. Due to the integrated spring ring, that is, the tolerance compensation element, it is possible to prestress the bearing in a defined way so that it is without play. It is designed as a three-point bearing, wherein it simultaneously has a high stiffness with a simultaneously low friction moment. By the use of the spring ring, corresponding part inaccuracies with respect to tolerances can be compensated without additional measures, so that overall a relatively economical steering bearing can be realized.

The spring ring itself is formed preferably from a spring steel sheet from which it is shaped accordingly, e.g., in a deep drawing process, so that it obtains the desired cross-sectional geometry. Here it is shaped such that it is supported on the inside of the sleeve with at least one end, preferably with its two ends, so that it can deflect relative to the sleeve. To design the bearing as compactly as possible, the inner contour of the sleeve is preferably similar to the outer contour of the spring ring. The two geometries are matched to each other such that the spring ring is indeed supported with its ends on the sleeve inner side, but between the spring ring and sleeve there is only a relatively narrow gap that has a sufficiently wide design that the spring ring can generate the desired prestressing after the flanging.

To be able to mount the steering bearing according to the invention as easily as possible on the steering spindle with respect to the shaft and simultaneously to guarantee the required high holding force, several radially inward directed claw-like holding sections are formed on the inner ring, preferably on the edge side. These claw-like holding sections engage or lock on a corresponding holding geometry on the shaft, so that it is possible to securely fix the inner ring and thus the bearing on the shaft. It is also advantageous for simple assembly if a bevel is provided on the inner ring on one edge, in particular, the edge opposite the optionally provided holding sections, on the inner periphery. This enables easier pushing of the bearing onto the shaft.

BRIEF DESCRIPTION OF THE DRAWINGS

An embodiment of the invention is shown in the drawings and is described in more detail below. Shown are.

DETAILED DESCRIPTION OF THE PREFERRED EMBODIMENTS

Figure 1:
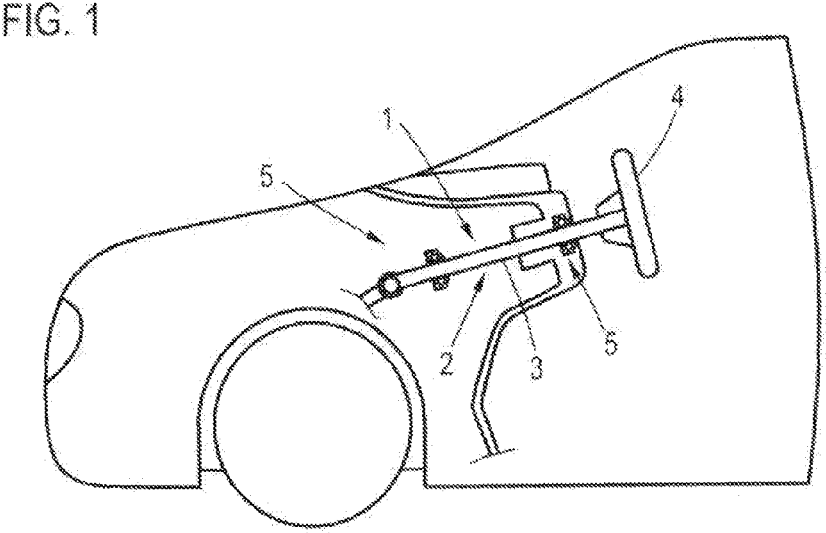
FIG. 1 a basic diagram of a steering system of a motor vehicle.

FIG. 1 shows, in the form of a basic diagram, a simplified view of a steering system 1 of a motor vehicle, comprising a steering column 2 with a steering spindle 3 that is connected to a steering wheel 4 and leads to a steering gear not shown in more detail. The steering spindle 3 is supported so that it can rotate in the shown example by two steering bearings 5 that are mounted with each of their inner rings on the steering spindle 3, while they are fixed with their outer rings in corresponding housings or similar supporting components. While FIG. 1 shows a rigid steering column, obviously also pivoting and/or telescoping steering columns are known. These are also supported so that they can rotate by means of corresponding steering bearings on the spindle side.

Figure 2:
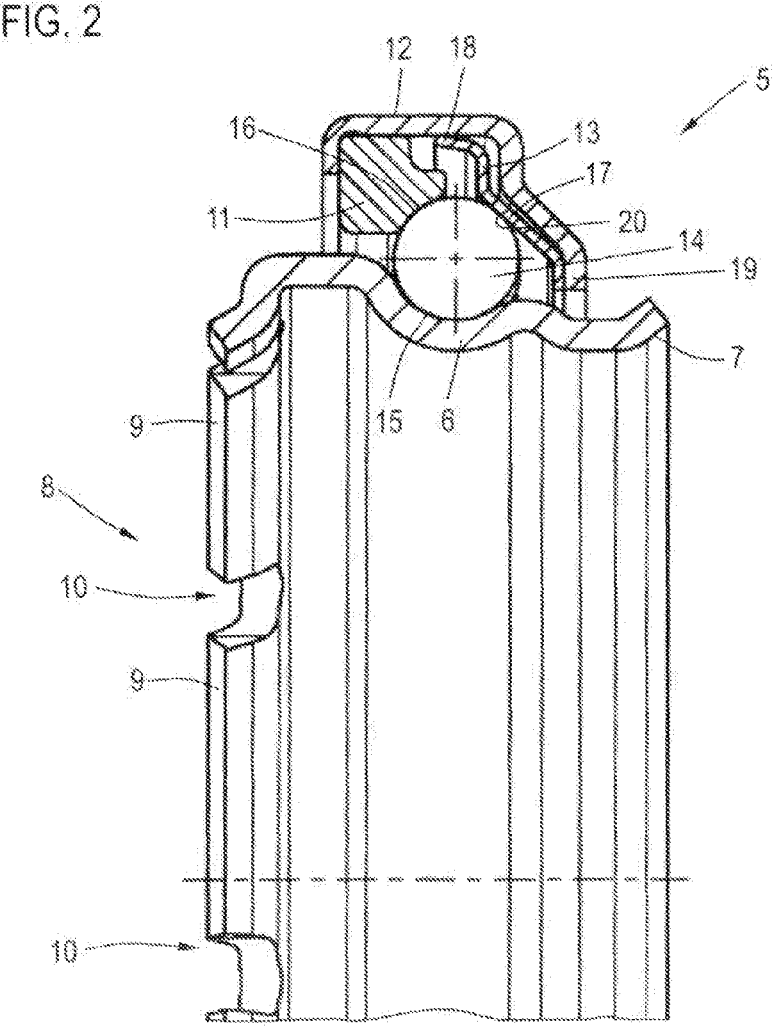
FIG. 2 a section view through a steering bearing according to the invention.

FIG. 2 shows a section view through a steering bearing 5 according to the invention. This bearing comprises an inner ring 6 by which the steering bearing 5 is fixed on the steering spindle 3. The inner ring is a drawn part. It has, on one end, a bevel 7 that is used as an assembly aid and enables simpler pushing of the steering bearing 5 onto the steering spindle 3. On the other end of the inner ring 6 there is a latching contour 8 comprising several inward directed claw-like holding sections 9 that have a spring-like design by means of corresponding openings 10. They are drawn inward and are used for latching onto a corresponding counter-contour on the shaft. Through this latching connection, the necessary holding force is realized in order to be able to install the steering bearing 5 on the steering spindle 3 according to specifications.

The steering bearing 5 also comprises an outer ring 11 that is a stamped part produced from a thick sheet and is designed such that a suitable support width is guaranteed in the housing in which the outer ring is fixed with respect to this part of the steering bearing 5. The outer ring 11 is surrounded by a sleeve 12 made from a softer sheet metal. In this sleeve 12, a spring ring 13 is held that is used as a tolerance compensation element and for prestressing the steering bearing 5.

In addition, the steering bearing 5 has a plurality of balls 14 that roll on corresponding running surfaces of the inner ring 6, the outer ring 11, and the spring ring 13. The inner ring 6 has a running surface 15 that has a corresponding radius, viewed in cross section, which is somewhat larger than the ball radius. The outer ring 11 also has a running surface 16 with a corresponding radius. In contrast, the spring ring 13 has a conical design in its middle section 17 as a part with multiple angles or bends. In this section 17, it is spaced somewhat apart from the sleeve 12. It is supported on the sleeve inside only with its ends 18, 19. This means that a certain elasticity of the spring ring 13 is given in the sleeve 12. The spring ring 13 now tensions the balls 14 against the raceways 15 and 16 of the inner and outer rings 6, 11, while it simultaneously forms the third raceway 20 of the three-point steering system 5. By the use of the spring ring 13 that is shaped, preferably drawn, as a spring steel component from a corresponding spring steel sheet, the steering system 5 can thus be prestressed on one hand and thus set without play, but on the other hand, because it is designed merely as a three-point bearing, it can have a relatively low friction design.

In the scope of assembly, initially the already preshaped spring ring 13 is inserted into the preshaped sleeve 12 that corresponds in its cross section approximately to the cross section of the spring ring but is not yet flanged, after which the inner ring 6 is pushed on. Then the balls 14 are inserted, after which the outer ring 11 is inserted. Finally, the sleeve 12 is flanged accordingly in a flanging process, so that the cross-sectional geometry shown in FIG. 2 is produced. This arrangement produces an overall compact structure.

LIST OF REFERENCE NUMBERS

1 Steering system
2 Steering column
3 Steering spindle
4 Steering wheel
5 Steering bearing
6 Inner ring
7 Bevel
8 Latching contour
9 Holding sections
10 Opening
11 Outer ring
12 Sleeve
13 Spring ring
14 Balls
15 Raceway
16 Raceway
17 Area
18 End
19 End
20 Raceway

The invention claimed is:

1. A steering bearing for supporting a steering column of a motor vehicle, comprising an inner ring and an outer ring having respective raceways on which balls roll, the outer ring is surrounded by a sleeve in which a spring ring is arranged that tensions the balls against the respective raceways and on which the balls roll, and the spring ring is supported on the inside of the sleeve only at two ends of the spring ring.

2. The steering bearing according to claim 1, wherein the spring ring is shaped from a spring steel sheet.

3. The steering bearing according to claim 1, wherein an inner contour of the sleeve corresponds in part to an outer contour of the spring ring.

4. The steering bearing according to claim 1, further comprising several radially inward directed claw-like holding sections formed on an edge side of the inner ring.

5. The steering bearing according to claim 4, wherein a bevel is provided on the inner ring on an edge opposite to the claw-like holding sections.

6. The steering bearing according to claim 1, wherein a bevel is provided on the inner ring on one edge.

* * * * *